UNITED STATES PATENT OFFICE.

FRED M. BUCK, OF VACAVILLE, CALIFORNIA.

REMEDY FOR PEAR-BLIGHT.

No. 864,074.  Specification of Letters Patent.  Patented Aug. 20, 1907.

Application filed January 7, 1907. Serial No. 351,256.

*To all whom it may concern:*

Be it known that I, FRED M. BUCK, a citizen of the United States, residing at Vacaville, in the county of Solano and State of California, have invented new and useful Improvements in Remedies for Pear-Blight, of which the following is a specification.

This invention relates to a remedy for blight on pear, apple, or loquat trees, or the like.

In practicing this invention I take two ounces of cyanid of potassium and four ounces of sulfur, both in the powdered form. To these is added a quart of water, and the whole is allowed to stand for twenty-four hours. It is then diluted with two and one-half gallons of water, this being the amount suitable for one application to each tree. It is applied by digging a hole six or eight inches deep around the root of the tree and pouring the diluted solution into the hole and then replacing the dirt. This process should be repeated with the same amount about one week afterwards.

I find that the remedy is taken up by the sap in the tree and perfectly protects the tree from blight. Also if a part of a tree has been already attacked by the blight, the application of the above remedy will stop the blight from spreading beyond the part affected. It thus acts both as a cure and as a preventive. Trees thus treated are found to be perfectly healthy, and the wood and fruit thereof, on being analyzed show no trace whatever of the cyanid of potassium.

I claim:—

As a remedy for pear blight, cyanid of potassium, sulfur and water mixed substantially in the proportions specified, substantially as described.

In testimony whereof I have hereunto set my hand in the presence of two subscribing witnesses.

FRED M. BUCK.

Witnesses:
FRANCIS M. WRIGHT,
D. B. RICHARDS.